US005855050A

United States Patent [19]

Christie et al.

[11] Patent Number: 5,855,050

[45] Date of Patent: Jan. 5, 1999

[54] SYSTEM FOR INSTALLING A SIGNAL TRANSMITTER TO A KEY

[75] Inventors: D. Scott Christie, Weymouth, Mass.; Thomas Wouters, Port St. Lucie, Fla.

[73] Assignee: Audiovox Corporation, Hauppauge, N.Y.

[21] Appl. No.: 969,247

[22] Filed: Nov. 13, 1997

Related U.S. Application Data

[62] Division of Ser. No. 745,847, Nov. 12, 1996, Pat. No. 5,819,568.

[51] Int. Cl.[6] .............................. B23P 13/00; B26D 7/01; B23B 49/02

[52] U.S. Cl. ........................... 29/33 R; 29/564.2; 83/452; 408/72 B

[58] Field of Search ................................ 29/33 R, 564.2, 29/564.7, 56.5, 56.6, 566.1; 83/452, 917; 408/22, 115 R, 72 B

[56] References Cited

U.S. PATENT DOCUMENTS

| | | | |
|---|---|---|---|
| 2,176,465 | 10/1939 | Merkl | 70/395 |
| 2,298,697 | 10/1942 | Hofmann | 70/395 |
| 3,780,550 | 12/1973 | Simorghi | 70/395 |
| 4,292,995 | 10/1981 | Mazzola | 70/408 X |
| 4,516,000 | 5/1985 | Ryberg et al. | 70/408 X |
| 4,901,548 | 2/1990 | Deslandes | 70/408 X |
| 5,058,465 | 10/1991 | Womack | 70/408 X |
| 5,207,082 | 5/1993 | LeMaitre | 70/408 X |
| 5,307,658 | 5/1994 | Kokubu et al. | 70/408 X |
| 5,383,345 | 1/1995 | Kallinger-Prskawetz | 70/408 X |
| 5,433,096 | 7/1995 | Janssen et al. | 70/408 X |
| 5,720,211 | 2/1998 | Canan | 83/452 |

FOREIGN PATENT DOCUMENTS

| | | | |
|---|---|---|---|
| 1107529 | 8/1981 | Canada | 70/237 |
| 0401541 | 12/1990 | European Pat. Off. . | |
| 2448607 | 9/1980 | France | 70/408 |
| 2039321 | 8/1990 | United Kingdom | 70/408 |

*Primary Examiner*—William R. Briggs
*Attorney, Agent, or Firm*—Morrison Law Firm

[57] ABSTRACT

A signal transmitter for transmitting control signals is fitted to a key element so that signals can be transmitted to an operating device with which the key is used. Illustrative is the fitting of an automobile ignition key to a fob housing in which the signal transmitter is carried. The head part of an ignition key is subjected to a punching operation to shear off a first portion of the head part leaving a remaining head part portion with wings disposed laterally at opposite sides of the key shank part. Holes are drilled in the remaining head part portion and the remaining head part portion is received in an anchorage in the housing with the key shank extending through a notch in the housing. The remaining head part is then secured to the housing with screws passing through the lateral wing openings and into anchorage posts formed in the housing. A punch unit is provided for modifying a regular ignition key head part and the punch unit has a station at which the modified key is held so that the openings in the lateral wings can be drilled at specified locations related to the locations of the housing anchorage posts. The housing includes two housing parts, one which holds the transmitter and the anchorage area and a second which is assembled together with the first to constitute a closed housing.

3 Claims, 5 Drawing Sheets

FIG. 3
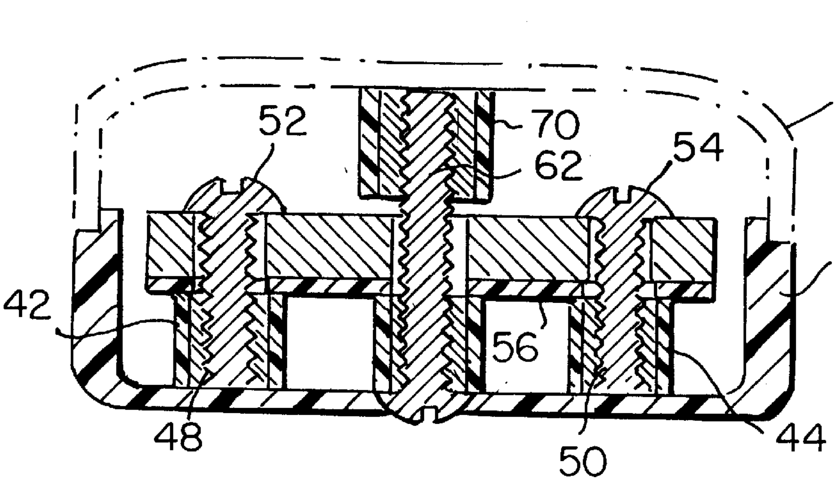
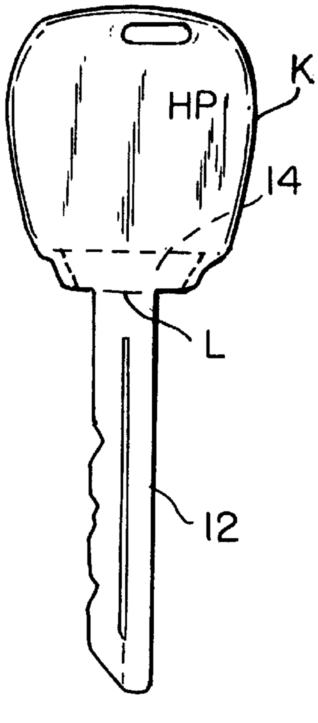
FIG. 4
FIG. 5
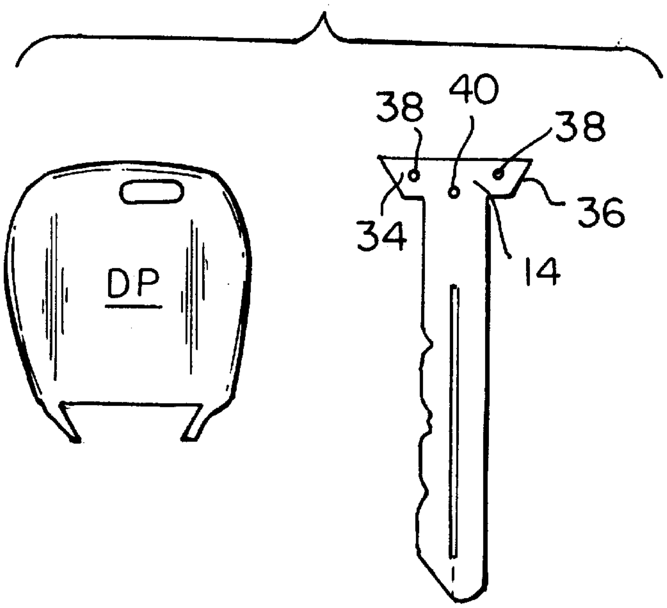

FIG. 6
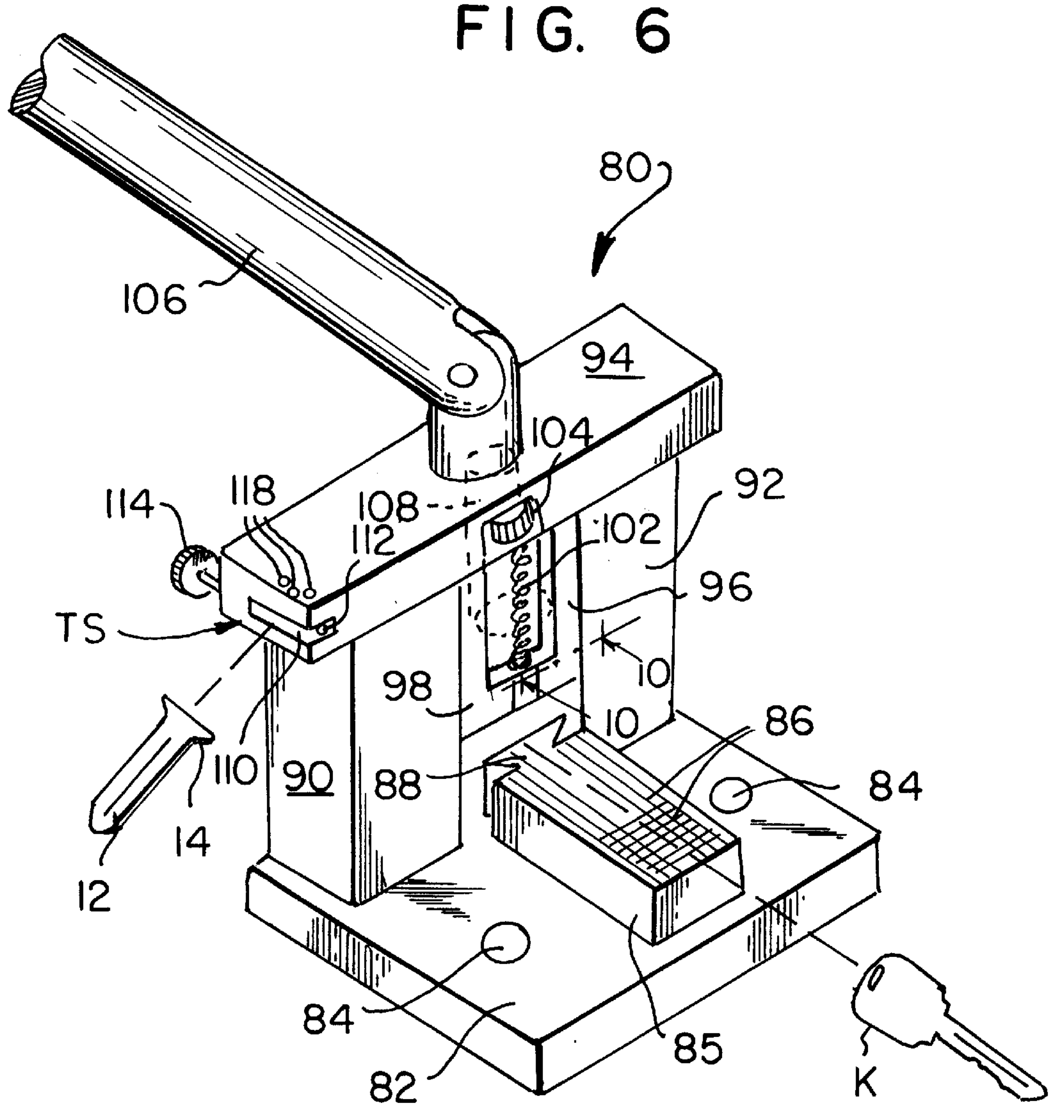
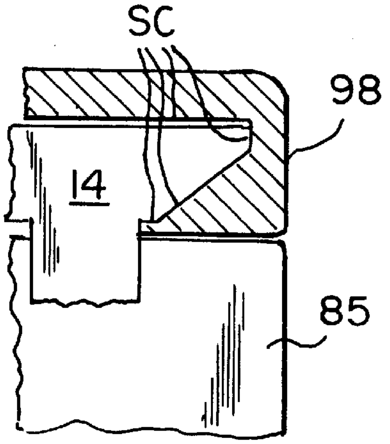
FIG. 10

SYSTEM FOR INSTALLING A SIGNAL TRANSMITTER TO A KEY

This is a division of application Ser. No. 08/745,847 filed Nov. 12, 1996, U.S. Pat. No. 5,819.568.

BACKGROUND OF THE INVENTION

The present invention relates to a method and system for installing a signal transmitter to a key and, more particularly, to such method and system as is used to fit the signal transmitter to a vehicle ignition key.

It is a known practice to equip a motor vehicle with remotely controlled devices such as anti-theft locks, ignition circuit cutouts and the like, energizing or deenergizing of these devices being effected with a signal transmitter which can be operated remotely of the vehicle to transmit a control function signal for controlling the device. The signal transmitter can, for example, be a unit type wherein the transmitter is the only component in a housing. This has some disadvantage in that the user must carry as separate items both the transmitter unit and the vehicle ignition key in order to be able to operate the vehicle.

To avoid having to carry separate key and transmitter components there has come into use combining of the key and the transmitter together as a unit in a housing, the housing being provided as two housing parts assembled together with screws. The housing in addition to containing the transmitter, sandwiches the key and two screws are used for holding the housing parts together one of these screws also passing through the key.

Current practice involves a user bringing his ignition key to an installer for the fitting of the key to a housing containing the transmitter. The installer must then cut off at least a part of the key head to fit it into the housing. For such purpose, the installer must use a metal saw or a shearing device such as snips. The variety of key shapes associated with the variety of makes of vehicles requires the installer to follow a corresponding variety of cutting/shearing procedures to effect proper final cut key geometry needed to accommodate the key in the housing.

After the installer has cut the key to allow its reception in one of the housing parts, the other housing part is assembled to the first and the housing parts are then secured together with two screws, one of these passing centrally through the key in the area of remaining key head. This assembly practice has a significant drawback in that repeated use of the key (involving subjecting the housing to a torque force when the key is manipulated during engine start) weakens the housing so that in many instances, the housing fractures or breaks leaving the user with an ignition key constituting little more than the shank of the original key.

This is believed to occur because the screws have support at the thin walls of the housing parts only and the key very little anchorage in the housing. With a single screw passing through the key, it is possible for the key to flex within the housing producing a torque effect on the housing which fatigues the housing sufficient to induce structure failure since the thin housing has little resistance to a torsion effect.

A further serious shortcoming found in the prior practice attends the need to open the casing on an occasion requiring battery replacement of other maintenance related to the transmitter. Since the key is not securely fixed to either casing part and since both screws must be removed to open the casing, the key can fall out of the casing.

It is desirable that a more effective manner of attaching a signal transmitter to a key as well as structure doing this, be provided.

OBJECTS AND SUMMARY OF THE INVENTION

Accordingly, it is an object of the invention to provide a method and system for attaching a signal transmitter to a key which overcomes the drawbacks of the prior art.

It is a further object of the invention to provide a method and system for attaching a signal transmitter to a key which can be employed with keys of different shapes.

It is a still further object of the invention to provide a method and system for attaching a signal transmitter to a key which function to produce enhanced, durable securement of the key to a housing wherein the transmitter is carried.

Another object is effect key and transmitter housing securement to each other in a manner that overcomes the prior and commonly experienced fracture of housings due to repeated use of the key in its normal use.

Another object is to simplify and make uniform the work a technician must perform when attaching a housing enclosed signal transmitter to a key.

A still further object is to provide a method and system for attaching a signal transmitter to a key which is particularly suited for use with motor vehicle keys.

Briefly stated, there is provided a signal transmitter for transmitting control signals which is fitted to a key element so that signals can be transmitted to an operating device with which the key is used. The fitting can be of an automobile ignition key to a fob housing in which the signal transmitter is carried. The head part of an ignition key is subjected to a punching operation to shear off a first portion of the head part and leave a remaining head part portion with wings disposed laterally at opposite sides of the key shank part. Holes are then drilled in the remaining head part portion. The remaining head part portion is then received in an anchorage in the housing with the key shank extending through a notch in the housing. The remaining head part is then secured to the housing with screws passing through the lateral wing openings and into anchorage posts formed in the housing. A punch unit is provided for modifying a regular ignition key head part and the punch unit has a station at which the modified key is held so that the openings in the lateral wings can be drilled at specified locations related to the locations of the housing anchor posts. The housing includes two housing parts, one which holds the transmitter and the anchorage area and a second which is assembled together with the first to constitute a closed housing.

In accordance with these and other objects of the invention, there is provided a method for fitting a fob unit to a key element. The fob unit comprises top and bottom plan coextensive housing parts which can be assembled together to define an enclosed fob housing having a first enlarged enclosure space and a second smaller enclosure space, the second smaller enclosure space being proximal an end of the housing. One of the housing parts has an anchorage area adjacent the said housing end. The key element has a head part and an elongated shank part. The method comprises shearing a first portion of the key element head part from a remaining head part such as to leave the remaining head part with lateral wings disposed at opposite sides of the key element shank part. The key element remaining head part is received in the anchorage area of the said one housing part and with the key element shank part extending outwardly through an end notch in said one housing part. The key element head remaining head part is fastened fixedly to said one housing part by passing fasteners through openings in each remaining head part lateral wing and into associated rigid fastener anchoring posts formed in the anchorage area. The top and bottom housing parts are then assembled together.

According to a feature of the invention, there is further provided a system for installing a signal transmitter to a key element so that control function signals can be transmitted by the transmitter to an operating device with which the key element is used, the key element having a head part and an elongated shank part. The system includes a housing, this housing including first and second housing spaces and there being housing structure in said first housing space defining an anchorage area. A transmitter unit is carried in the second housing space. The system also includes a punch unit, the punch unit including shearing means, and key element clamping means. The key element clamping means is operable to clamp the key element on the punch unit with the key element head part disposed along an operating shear course of the shearing means. The shearing means is operable to shear a first portion of the key element head part from a remaining head part such as to leave the remaining head part with lateral wings which dispose at opposite sides of the key element shank part. The key element remaining head part lateral wings are receivable in the anchorage area of the housing with the key element shank part extending outwardly of the housing. The punch unit further includes a key element remaining head part receptive target station at which the key element remaining head part, prior to its reception in the anchorage area, can be located while openings are drilled in each remaining head part lateral wing. Anchorage posts are provided in the housing anchorage area and these anchorage posts are location positioned in the anchorage area such as to register with the openings in the lateral wings of the key element remaining head part when said remaining head part is received in the anchorage area so that fastener elements can be passed through said lateral wing openings and into the anchorage posts thereby to fixedly secure the key element to the housing.

According to a further feature of the invention, a key element/key fob unit is provided this unit comprising the combination of an elongate key element, and a key fob housing to which the key element is fixed. The key element has a key shank and a head part at one end of the shank, the head part having wings extending laterally at each of two opposite sides of the shank. The housing has a larger enclosed space and a smaller enclosed space, the housing also having a notch opening at an end thereof, this notch opening communicating with the smaller enclosed space. Rigid anchor structure is carried in said housing smaller enclosed space adjacent said notch opening, said rigid anchor structure presenting a mounting surface for reception thereon of the key element head part with the shank passing outwardly of the housing through said notch opening, said key element head part being secured fixedly to said anchor structure with rigid fasteners passing through the wings of said key element head part and into said anchor structure.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a sectional view, on enlarged scale, taken along the line III—III in FIG. 2 and depicts the manner of securement of the key element to the anchor posts in the housing bottom part;

FIG. 4 is a plan view of an automobile ignition key which is to be modified for effecting installation of a signal transmitter therewith;

FIG. 5 is a plan view of the FIG. 4 key following punching showing the first portion of the key head part which is to be discarded and the remaining head part with the two lateral wings and which is still integral with the key shank;

FIG. 6 is a perspective view of a punch unit used to shear the FIG. 4 key element head part;

FIG. 10 is a fragmentary plan sectional view on enlarged scale taken on the line 10—10 in FIG. 6 illustrating the arrangement of shearing cutter and an anvil segment which define a shearing course along which the key head is sheared.

DETAILED DESCRIPTION OF THE PREFERRED EMBODIMENT

The method and system for installing a signal transmitter to a key is described herein in respect of modification of an automobile ignition key to equip it with a signal transmitter that transmits control function signals to operative components in a vehicle such as anti-theft alarm systems, ignition cut out units, vehicle starting circuitry, door locks etc. It could be used just as advantageously for key/signal transmitter combination in non automobile uses where a key and signal transmitter are used for controlling operating devices and systems.

Figure 1:
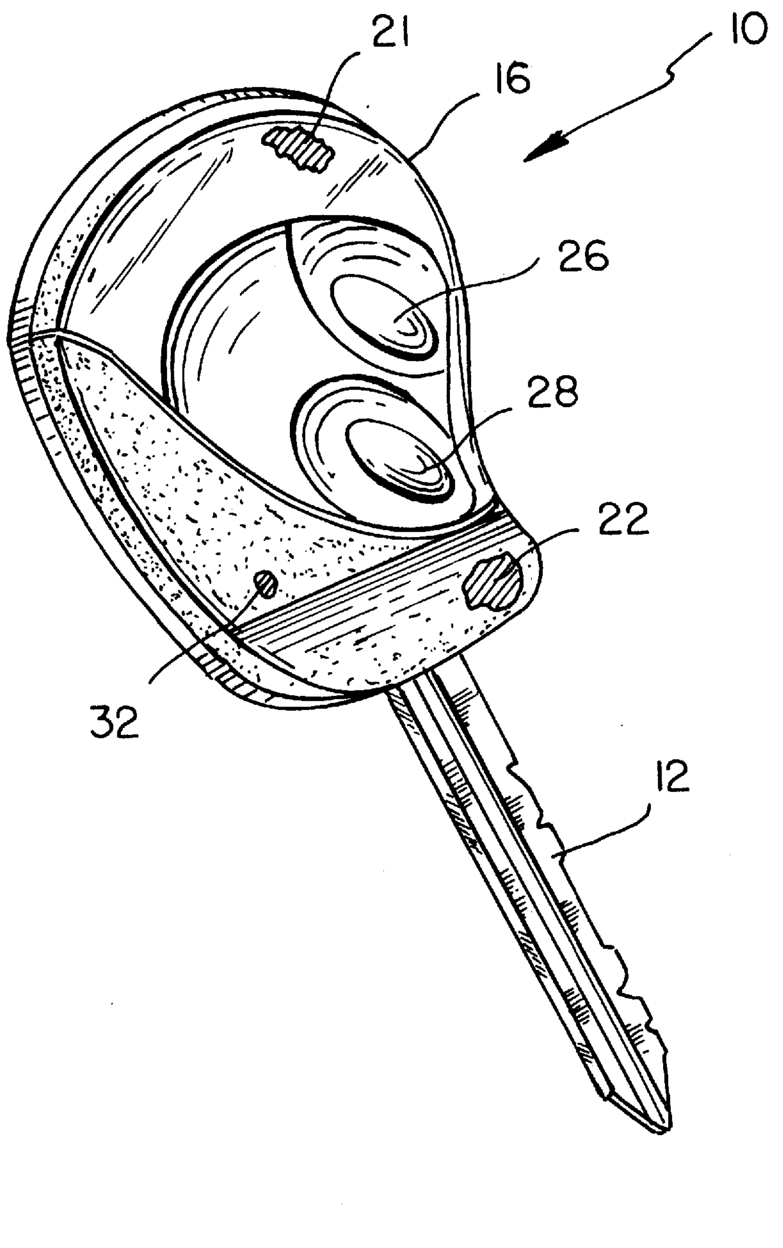
FIG. 1 is a perspective view with portions broken away of an ignition key to which a signal transmitter has been attached, the two being fixed in a key fob configured housing.
Figure 2:
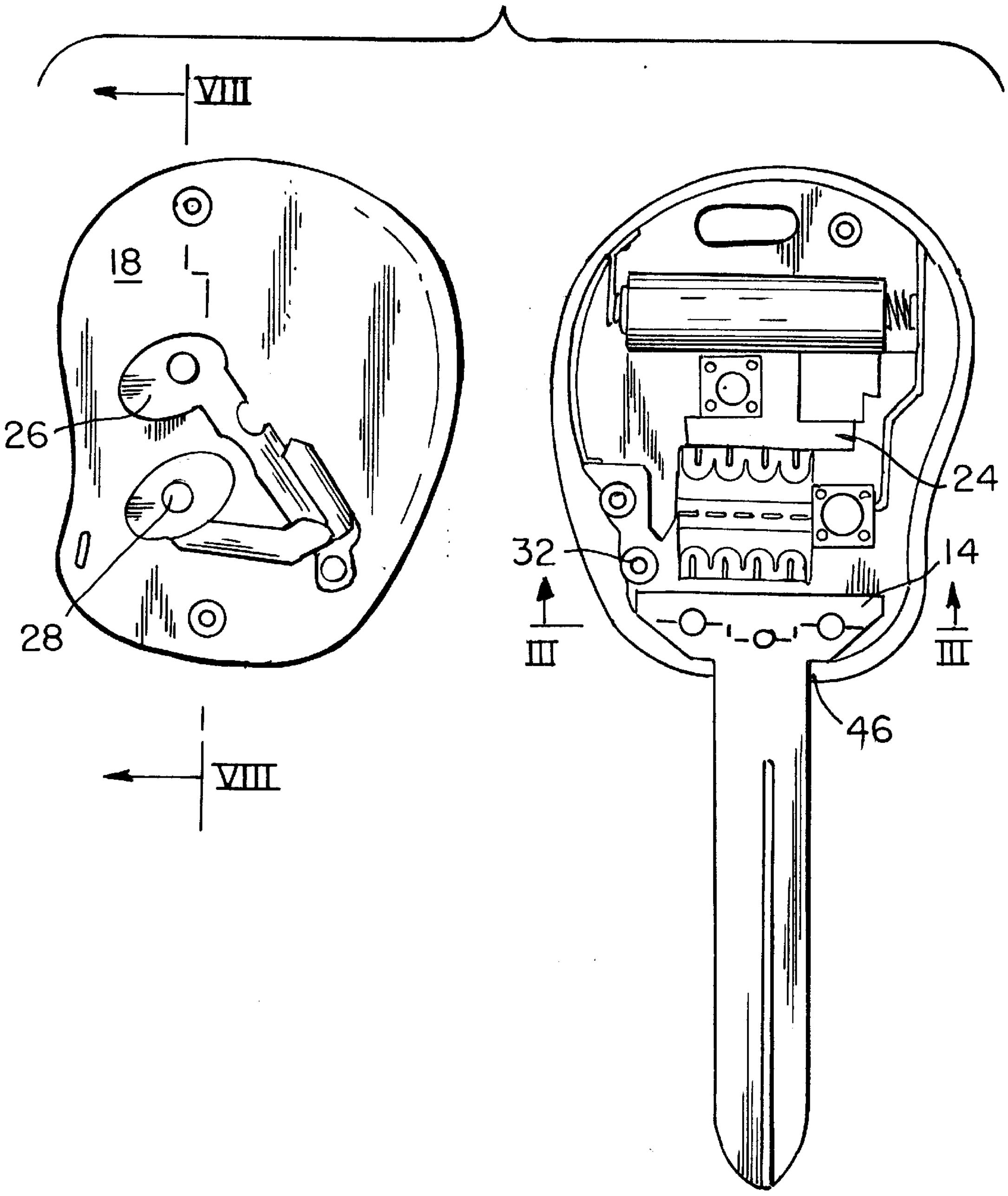
FIG. 2 is a perspective view showing of the FIG. 1 device with the top housing part removed from the bottom housing part so that the interiors of the respective housing parts are seen.

Referring to FIGS. 1 and 2 which depict an ignition key 10 fitted with a signal transmitter, the ignition key 10 includes a key element having a shank part 12 and a head part 14, the key element being the modified form of a particular vehicle ignition key that was subjected to a shearing operation to remove a portion of the key head part and thereby adapt it for reception in a key fob housing 16 in manner as will be described below.

The key fob housing 16 shown in assembled condition in FIG. 1 and which can be molded from various of polymeric compositions, comprises as shown from FIG. 2, respective top and bottom housing parts 18, 20 and has a first enlarged enclosure space within the housing region depicted at 21 and a second smaller enclosure space within the housing region depicted at 22 (FIG. 1), this smaller enclosure space being at the end of the housing from which protrudes key shank 12.

The enlarged enclosure space 21 of the housing serves to receive a signal transmitter 24 therein, the signal transmitter being a unit of a type known to a person skilled in the art and employed to generate control function signals in known manner and for purposes enumerated earlier herein. Operation of the signal transmitter 24 is effected with push button membrane switches 26, 28, the push buttons being carried in the top housing part 18 as seen in FIG. 1 and the switches (not shown) in the bottom housing part as seen in FIG. 2. Internally of the top housing part 18, the membrane switches 26, 28 are as seen in the FIG. 2 inverted showing of the top housing part. The signal transmitter includes an LED 32 that emits light to show proper operating condition.

While the housing and transmitter are exemplified above as including two push button switches, the number of push button switches in the housing has no effect on the invention as it is applicable to other circumstances equally. For example, the practice of the invention is exactly the same where only one push button switch is used with the transmitter.

The smaller housing enclosure space 22 serves as an anchorage area wherein the key element is fixedly secured in the key fob housing. The key element head part that remains following ignition key shearing modification is configured as a pair of lateral wings 34, 36 extending to each side of the key shank 12 (FIG. 5), this remaining head part being provided following shearing with drill holes 38 in each lateral wing and a drill hole 40 located centrally between and slightly offset of the two holes 38.

Securement of the key element to the anchorage area in the bottom housing part 20 is effected by receiving the key element lateral wings 34, 36 in the anchorage area with the wings set over companion anchor posts 42, 44 formed as part of the bottom housing part structure proximal a housing end and adjacent a notch or slot 46 in the bottom housing part through which the key shank will extend in the manner seen in FIG. 2. Screw fasteners 52, 54 are then inserted through the lateral wing drill holes 38 from the key element top and threaded down into the anchor posts.

As best seen in FIG. 3, the anchor posts 42, 44 comprise, e.g., cylindrical hollow bosses molded as part of the bottom housing part 20 and in which are embedded rigid, i.e., metallic internally threaded tubular posts 48, 50. The rigidity of attachment of the key element to the bottom housing part 20, coupled with the manner of assembly connection together of the two housing parts, provides a highly strengthened key/transmitter arrangement that effectively eliminates housing structure fracture or loosening or separation of the key element from the fob.

As noted above, ignition keys of a wide range of shapes and thicknesses exist, various automobile makers styling their ignition keys, e.g., to establish in the public mind ready association of the key configuration with the maker. Desirably, the key fob housing 16 should be compatible for use with at least most of these key shapes and thicknesses. The matter of differing key plan shape and particularly that of the key head part HP (FIGS. 4 and 5) is eliminated by the head part shearing in a way as will be discussed below, but in respect of key thickness, compensation must be made to assure that the key shank 12 passes outwardly of the fob housing through notch or slot 46 in the latter with proper clearance of the housing at the notch opening which if not present would produce key element cocking at the anchorage area and inability to achieve complete tightening of the key element remaining head part to the bottom housing anchorage area.

Figure 9:
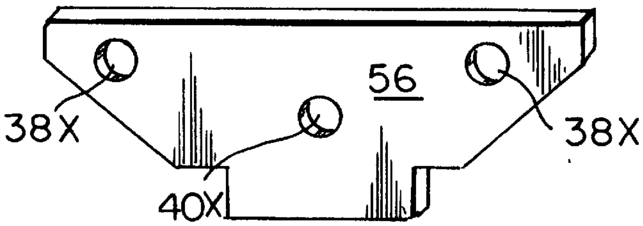
FIG. 9 is a perspective view of a shim piece which can be inserted under the key head remaining part to compensate for key thickness below a certain value to thereby clearance locate the key element shank relative to the housing end notch.

Compensation for the foregoing is achieved where needed, with use of a plastic shim piece 56 depicted in FIGS. 9 and 3. The shim piece 56 is provided in different thicknesses. Key elements with a thickness of 2.5 mm or more have requisite thickness to insure proper seating of the key element on the anchor posts 42, 44 so that the shank 12 properly passes clearly through the housing notch. Where shank thickness is less than 2.5 mm, its thickness difference is made up to that thickness with a shim piece taken from a set of such of various thicknesses.

It is convenient to mark the shim pieces 56 with various undersize key shank thickness values for easy identification of which shim piece is to be selected. For example, if a key shank thickness is 2.2 mm, the shim piece selected will be one marked “2.2”. That particular shim piece will in fact be 0.3 mm, the thickness needed to make up a key shank and shim piece total thickness of 2.5 mm.

Shim piece 56 as seen from FIG. 9, is plan configured like the key element remaining head part and has lateral wings. Further, the shim piece has drill holes 38x, 40x corresponding in number and location with those drilled in the key element. FIG. 3 shows how the shim piece sits on the anchor posts 42, 44 with the key element head part 14 superposed thereon, the depiction further showing how the screw fasteners 52, 54 pass through the key element, the shim piece and then threadedly into the tubular posts 48, 50.

Figure 7:
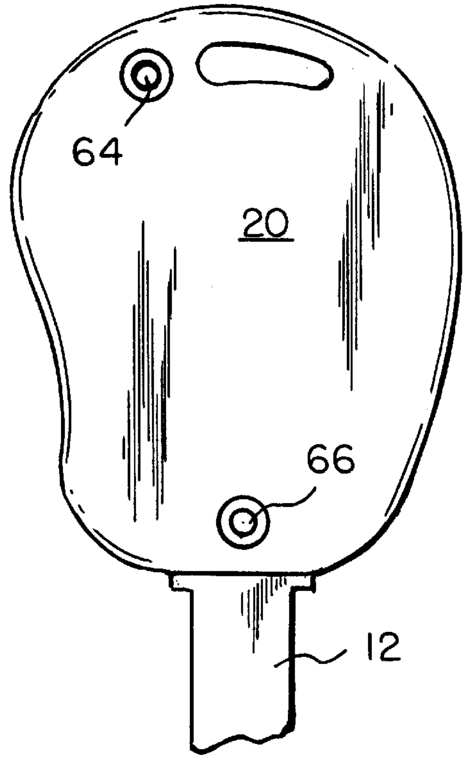
FIG. 7 is a plan view looking at the broad outer face of the bottom housing part and depicting the openings therein through which are inserted the screws employed to hold the top and bottom housing parts in assembled housing configuration.

With the key element head part 14 securely anchored in bottom housing part 20, the top housing part 18 will be assembled thereto to form the enclosed key fob housing 16. For that purpose assembly screws 60, 62 will be used, these assembly screws passing first through openings 64, 66 in bottom housing part 20, these openings being shown in FIG. 7. At the inner face of top housing part 18, a pair of screw posts 68, 70 are formed, these being like the anchor posts earlier described.

Figure 8:
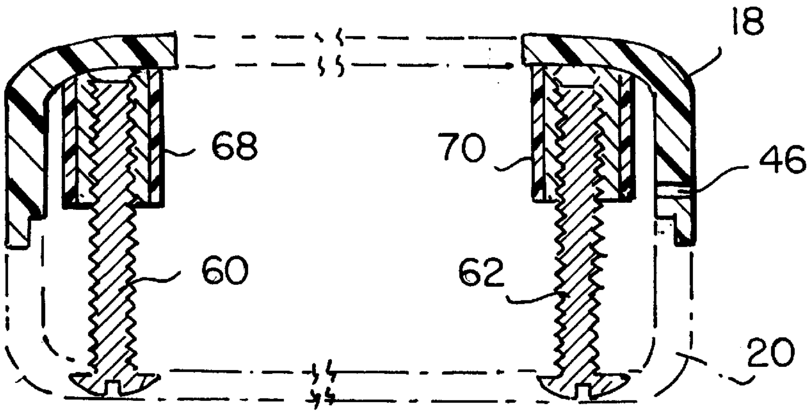
FIG. 8 is a section view, on enlarged scale, taken along the line VIII—VIII of FIG. 2 depicting the screw posts carried in the top housing part to which the screws used for holding the housing parts assembled are secured.

The screw posts 68, 70 are shown in more detail in FIG. 8 which illustrates the accessing of the housing by the assembly screws 60, 62 from the underside. The bottom housing part structure at openings 64, 66 preferably will be countersunk to accommodate the assembly screw heads to thereby provide a non protuberant smoothness of the housing bottom outside face.

FIG. 3 also shows assembly screw 62. The strengthened securement of the key blank in the housing is enhanced by virtue of assembly screw 62 passing through opening 40 in the key element head part 14, this screw passage best being seen from FIG. 3. FIGS. 3 and 8 (partly in phantom) show the assembled condition of the housing parts 18, 20.

The system for attaching a transmitter carrying key fob to an ignition key element provides for simple yet quality finished product result at the hands of the installer. The installation can be made at a locksmith shop, auto dealer, and other facilities such as home improvement products centers.

Utilized in connection with making the installation is the punch unit 80 shown in FIG. 6. Punch unit 80 is used to modify in a punch operation, a regular ignition key to configure it to a key element geometry common in part in all ignition key/key fob attachments.

Referring to FIG. 4, the regularly provided ignition key K has a head part HP and shank 12. As a preliminary to making the installation, the key K will be modified to remove a substantial portion of the head part HP. If the key is one having a plastic coating over the head part, the plastic coating should be removed by the installer before proceeding with the head part shearing.

To assure that the ultimately finished fob/key product will have clearance when inserted in the ignition switch to be rotated and the fob housing clear the ears found on many ignition switch mountings, the installer will with the key K in the ignition switch scribe a line L on the key where the shank clears the mounting ears, this for purpose as will be noted below.

Referring again to FIG. 6, punch unit 80 includes a base 82 having through holes 84 with which the unit can be bolted to a support table etc (not shown). Mounted on the base 82 is an anvil 85, this being provided with long and transverse markings 86 disposed on top thereof. The forward end of the anvil is provided as at 88 with a key cutting segment configured correspondingly with the key element head part 14. Base 82 mounts a pair of spaced apart columns 90, 92 on top of which a crosspiece 94 is supported.

A cutter unit 96 is mounted between the two columns 90, 92, the cutter unit being movable slidably vertically between the columns. As seen in FIG. 10, the cutter unit includes a cutter 98 configured complementary with the anvil key cutting segment 88 so as to define a shearing course SC along which the key K will have its head part HP sheared and in manner as will be discussed shortly. A set screw or clamp 102 is supported at the front side of the crosspiece 94 and extends downwardly therefrom. By rotating thumb wheel 104, the set screw can be moved into holding contact with a key K on the anvil.

A crank arm 106 is rotatably carried on crosspiece 94 and is fixed to a vertically extending screw 108 to which the cutter 98 is mounted, the cutter being internally threaded for that purpose. As person skilled in the art will recognize, by rotating the crank arm in each of two opposite directions, the cutter can be raised and lowered vertically. Description of operation of the punch unit 80 will be given next.

A key K is positioned on top of the anvil 85 with the scribe mark L aligned below the forward edge of the cutter 98 and the shank sides are arranged to be parallel with the long markings 86. Thumb wheel 104 is rotated to move the set screw 102 down against the key K to hold it on the anvil. Crank arm 106 is the rotated in appropriate direction to move the cutter 98 downwardly. In the downward movement of cutter 98, the cutter cutting edge which is shown in FIG. 10 and which with a cooperating cutting edge on the anvil key cutting segment define the shearing course SC effects shearing of the key head part HP, the crank arm being rotated until the full punch through of the key head part is achieved.

FIG. 5 shows the discard part DP of the key head part HP, the remaining head part 14 being left integral with the key shank 12 and this representing the key element that is to be attached to the fob housing. Following the shearing, it remains to drill the holes 38, 40 in the key element head part 14 as described next.

Referring again to FIG. 6, the punch unit 80 embodies target means use in connection with drilling of holes in the key element head part 14. In respect of this need, it is necessary that the three holes 38, 40 be accurately located in head part 14 to assure that the screws securing the head part 14 to the bottom housing part anchorage and the housing parts assembly screw that is to pass centrally through head part 14, can locate aligned with mating screw receptive components in the housing parts.

The punch unit has a target station TS which includes a slot 110 at one end of the crosspiece 94. Located in the slot and close to the crosspiece front side is a guide post or pin 112. At the top side of the crosspiece and located over the slot are three drill guide passages 118 arranged in location correspondence to the openings locations on the key element head part 14. The key element is inserted in the slot and a set screw 114 is used to tighten the key element head part 14 right lateral wing 36 against the pin 112. This is a point contact of the pin with the key element when the head part lateral wing 36 (FIG. 5) intersects with shank 12. This holds the head part securely while the installer uses a drill guided in passages 118 to drill the holes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for installing a signal transmitter to a key element so that control function signals can be transmitted by the transmitter to an operating device with which the key element is used, the key element having a head part and an elongated shank part, the system comprising a housing, said housing including first and second housing spaces, there being housing structure in said first housing space defining an anchorage area, a transmitter unit carried in said second housing space, and a punch unit, said punch unit including shearing means, and key element clamping means, said key element clamping means being operable to clamp the key element on the punch unit with the key element head part disposed along an operating shear course of said shearing means, said shearing mean being operable to shear a first portion of the key element head part from a remaining head part and such as to leave the remaining head part with lateral wings disposed at opposite sides of the key element shank part, said key element remaining head part lateral wings being receivable in the anchorage area of said housing with the key element shank part extending outwardly of the housing, said punch unit further including a key element remaining head part receptive target station at which the key element remaining head part, prior to its reception in the anchorage area, can be located while openings are drilled in each remaining head part lateral wing, there being anchorage posts in the housing anchorage area, said anchorage posts being location positioned in said anchorage area such as to register with the openings in the lateral wings of the key element remaining head part when said remaining head part is received in said anchorage area so that fastener elements can be passed through said lateral wing openings and into said anchorage posts thereby to fixedly secure the key element to the housing.

2. The system of claim 1 in which the punch unit includes means for fixedly holding the key element remaining head part at the target station during the course of drilling of the openings therein.

3. The system of claim 1 in which the punch unit includes an anvil block to which the key element is clamped during shearing of the key element head part, the anvil block having alignment indicia thereon for effecting a desired alignment of the key element shank part with respect to the operating shear course of said shearing means.

* * * * *